UNITED STATES PATENT OFFICE.

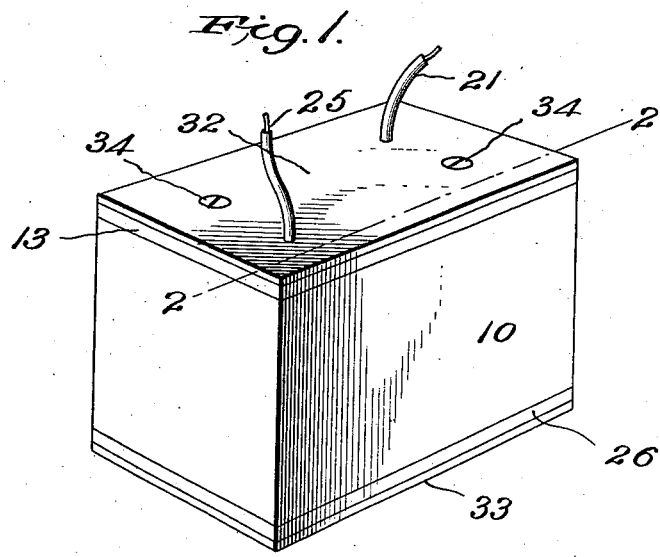
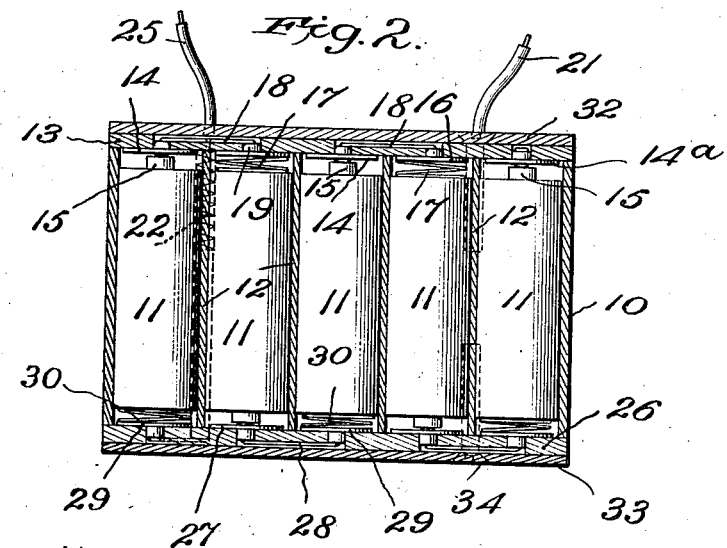

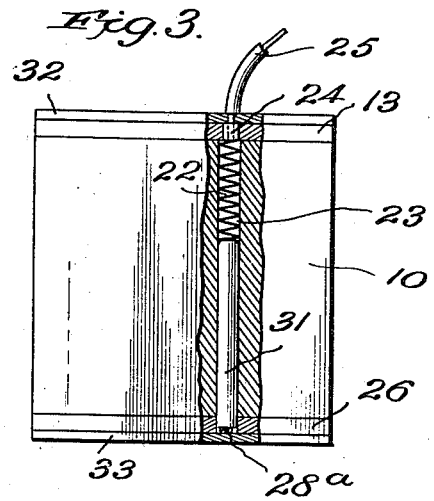

ISEDOR FERTMAN, OF NEW YORK, AND HARRY KORETZKY, OF BROOKLYN, NEW YORK.

BATTERY-CONTAINER.

1,316,568.     Specification of Letters Patent.   Patented Sept. 23, 1919.

Application filed December 19, 1918. Serial No. 267,457.

*To all whom it may concern:*

Be it known that we, ISEDOR FERTMAN and HARRY KORETZKY, both citizens of the United States, residing at New York, in the county of Bronx and State of New York, and at Brooklyn, Kings county, New York, respectively, have invented certain new and useful Improvements in Battery-Containers; and we do hereby declare the following to be a full, clear, and exact description of the invention, such as will enable others skilled in the art to which it appertains to make and use the same.

Our present invention relates to an improved container for electric battery cells of all kinds, but more particularly for batteries of dry cells such as are used for telephonic and other signaling and lighting purposes. In order to provide a secure and compact battery unit for such uses which shall be watertight and otherwise safe against accidental interior short circuits, it has been hitherto common to place the cells in a group within a watertight insulating container and, after arranging the necessary interior connections, to close and secure the whole by pouring a suitable sealing material over the whole group, which material hardens on cooling. The objection to this arrangement is that, where only one or two of the cells goes bad, the whole battery becomes useless and must be discarded, as the value of the remaining cells does not warrant the time and labor involved in opening the battery and identifying and removing the bad cells.

Our invention has for its principal object to provide a battery and container which, while just as secure, compact and convenient as those above described, shall also make it possible easily and quickly to identify and replace any cells that fall below the desired standard, thus preventing the loss of the entire battery when only a portion of the cells are defective.

Our container is so constructed that any unskilled person can assemble a battery within it, since the mere act of replacing the cells in the sockets provided for them insures their being properly connected in circuit when the container is closed. These containers can be made of any desired shape or size, and of any suitable insulating material, such as fiber or hard rubber.

We have illustrated our invention by way of example in the accompanying drawings, wherein Figure 1 is a perspective view of a preferred form of assembled container, Fig. 2 is a sectional view of the same on the line 2—2 of Fig. 1, Fig. 3 is an end view with a portion broken away to show the transverse electric connection, Figs. 4 and 5 are respectively a top and a bottom plan view of the upper connection plate, and Figs. 6 and 7 are similar views of the lower connection plate.

Our container is constructed so as to inclose and automatically connect in any suitable electric relation a battery of cells inserted alternately right side up and up side down. In other words, each cell is reversed with relation to the adjacent cell, and for purposes of convenience we refer to this as a mutually inverted position of cells.

The apparatus comprises a body portion having a group of sockets or chambers for holding separate cells and permanent terminals and electric connections therefor located at opposite ends of the cells and adapted to connect the cells when in place in the desired electric relation with each other, when said cells are in mutually inverted position. The requisite terminals and connecting conductors are carried by connection plates, one at least of which is removable, and we prefer to make both removable for greater convenience and economy in manufacture. We also prefer to provide suitable covers, which, in the preferred form shown, take the form of flat plates suitably secured at top and bottom of the container. This preferred form is thus easily taken apart and assembled and gives ready access to all battery cells and connections.

The body portion 10 contains the sockets or chambers into which fit the cells 11, which are placed in mutually inverted position as shown in Fig. 2. This body is made of hard rubber, fiber or other suitable insulating material and is cast or bored with cylindrical chambers separated by partitions 12. It may, of course, be made in one or more pieces as found convenient.

In the specific form shown the cells are intended to be connected in series, and we have shown the upper and lower connecting plates with their terminals and connecting conductors as arranged to carry out this relation of the cells, but it is to be understood that we are not limited to an arrangement for series or any other particular connection of cells.

The upper plate 13 is made of suitable insulating material and is provided with metallic terminals on its under side so placed as to make electric contact each with a terminal of a cell 11. We prefer to provide thin disks 14 for making contact with the central (usually carbon) cell electrodes 15, and similar disks 16, furnished with springs 17, for making contact with the outer cell electrodes. Contiguous disks 14, 16, form pairs which are permanently connected electrically by wires 18 set into grooves in the top of the plate 13 and connected securely to the disks 14 and 16 by solder or brazing 19. At one corner there is a single disk or terminal 14$^a$ connected by the wire 18$^a$ to an upper terminal 20, to which one external conductor 21 is connected.

We prefer to arrange our container so that both external conductors or leads enter on the same side, which we call the top of the battery. For this purpose there is provided a transverse connection, shown in Fig. 3, one member of which is a long spiral spring 22, which fits into a passage 23 in the main body, and makes contact with the second member of the transverse connection, as hereinafter described. This spring is connected with a terminal 24 on the top of the plate 13, with which is connected the second external lead 25.

The lower connection plate 26 is supplied with metallic terminals in a manner similar to that just described; these consisting preferably of disks 27 for the carbon cell electrodes connected by wires 28 in pairs with disks 29 provided with springs 30 for making contact with the external or zinc electrodes of the cells 11. The arrangement described provides a spring at one end of each cell, thereby insuring firm contact of its electrodes at both ends.

At one corner, a single disk 29$^a$, with its spring 30$^a$, is connected on the outside by a conductor 28$^a$ to a metallic rod 31 which projects at right angles from the upper face of the plate 26, and is adapted to extend into the opening 23, when the whole is assembled. This rod is the second member of the transverse connection and makes efficient contact with the first member 22, as shown in Fig. 3.

The cells 11 having been inserted into the chambers or sockets in the main body, as shown in Fig. 2, the upper and lower connection plates are applied in the manner above described, and the whole is connected together in any suitable manner. We prefer to use two flat cover plates 32 and 33 fastened outside of the connection plates 13 and 26, as by means of screws 34 passing through said cover plates, through holes 35 in the connection plates, and screwing into threaded holes in the body portion (not shown).

The series connection of the cells is produced by assembling the parts as shown, and may be traced as follows—from the lead 25, through the transverse connection 22, 31, terminal 29$^a$, from zinc to carbon of the entire series of cells by means of the pairs of disks on the upper and lower connection plates alternately, and finally reaching the corner disk 14$^a$, out by wire 18$^a$, terminal 20 and external lead 21 (Fig. 1). It will be understood that those skilled in the art can produce other circuit relations among the cells by varying the connections in a variety of well known ways.

It will be seen that our invention provides a container for automatic connection of battery cells, which can be rapidly and easily assembled, and whereby defective cells can be easily replaced by unskilled persons.

Various changes can be made in our container without departing from the scope of our invention, and we do not limit ourselves to the details herein shown and described.

What we claim is—

1. A container for connection of battery cells comprising a body portion and contact terminals supported so as to face each other in pairs at top and bottom of said body portion, one terminal of each pair being adapted to make efficient contact with the external electrode of a battery cell and the other being adapted for making efficient contact with the central electrode of a cell.

2. A container for connection of battery cells comprising a body portion, removable connection plates at top and bottom of said body portion, end terminals and connections on said plates adapted to connect in series cells placed in mutually inverted positions in said chambers.

3. In a container for automatic connection of battery cells, a body portion, connection plates at top and bottom thereof, one of which is removable, suitable terminals and connecting conductors on said plates, external leads entering the container on one side, and a separable transverse connection passing through said body portion and connecting one of said leads with the connections on the opposite side of the body portion.

4. A container of the character generally set forth in claim 3 hereof wherein the transverse connection comprises a rod projecting inward from one connection plate and a resilient member projecting inward from the other connection plate and adapted to make contact with said rod.

5. In a device of the character set forth generally in claim 1, rows of metallic contact disks on the connection plates, contact springs on the alternate disks in each row and conductors connecting each spring disk with the disk next it.

6. A container, rows of cells therein placed in mutually reversed positions, a connection plate on each side and means on said plates adapted to connect one electrode of each cell directly to the electrode of opposite polarity in the contiguous cell.

In testimony whereof, we affix our signatures.

ISEDOR FERTMAN.
HARRY KORETZKY.